(12) United States Patent
Koll et al.

(10) Patent No.: US 7,269,111 B2
(45) Date of Patent: Sep. 11, 2007

(54) DETECTING RADIUS OF OPTICALLY WRITABLE LABEL SIDE OF OPTICAL DISC AT WHICH MARKINGS HAVE NOT BEEN WRITTEN

(75) Inventors: Andrew Koll, Albany, OR (US); David Pettigrew, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 10/867,436

(22) Filed: Jun. 14, 2004

(65) Prior Publication Data

US 2005/0276189 A1  Dec. 15, 2005

(51) Int. Cl.
G11B 7/00 (2006.01)
(52) U.S. Cl. .................. 369/53.24; 369/275.1
(58) Field of Classification Search ............ None
See application file for complete search history.

(56) References Cited

U.S. PATENT DOCUMENTS

2002/0191517 A1  12/2002  Honda et al.
2003/0108708 A1  6/2003  Anderson et al.
2004/0051778 A1  3/2004  Bronson et al.
2004/0071454 A1  4/2004  Nishizawa et al.
2005/0180304 A1*  8/2005  Onodera et al. ......... 369/275.3

FOREIGN PATENT DOCUMENTS

EP  1308938  5/2003
JP  2002203321  7/2002

OTHER PUBLICATIONS

International Search Report for PCT Patent Application No. PCT/US2005/018787 filed May 27, 2005. Report issued Nov. 15, 2005.

* cited by examiner

Primary Examiner—Paul W. Huber

(57) ABSTRACT

A method of an embodiment of the invention rotates an optical disc having an optically writable label side. The optical disc is radially scanned with a laser incident to the optically writable label side, from a first edge of the optical disc to a second edge of the optical disc. While the laser is radially scanned from the first edge to the second edge of the optical disc, a first radius at which markings have not been written to the optically writable label side of the optical disc, next to a second radius at which markings have been written to the optically writable label side of the optical disc, is detected.

34 Claims, 8 Drawing Sheets

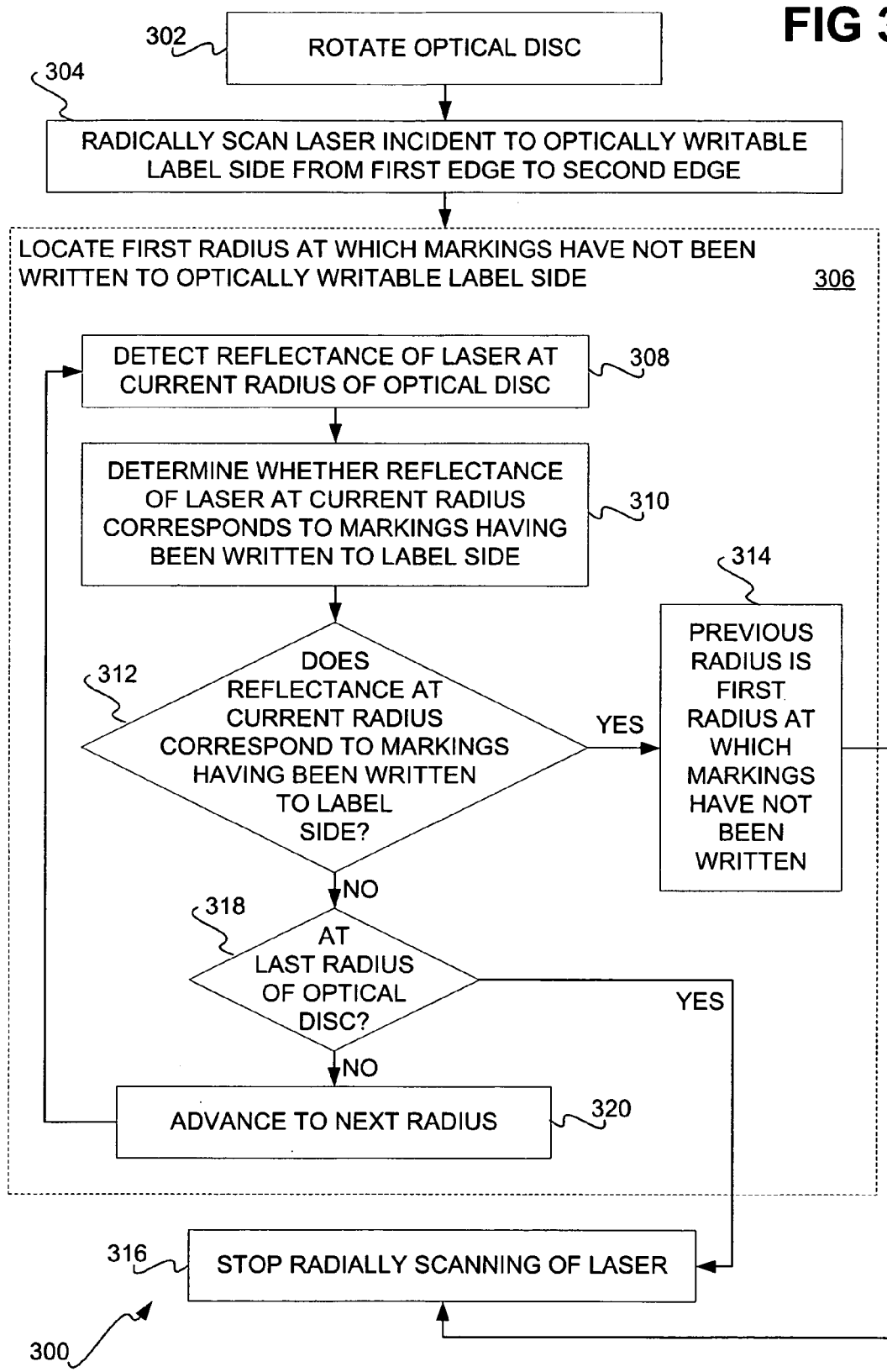

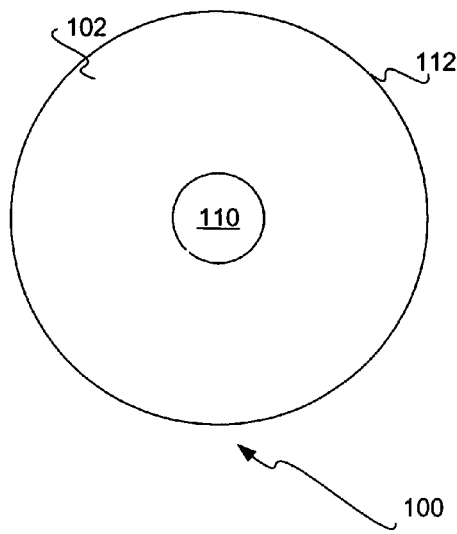
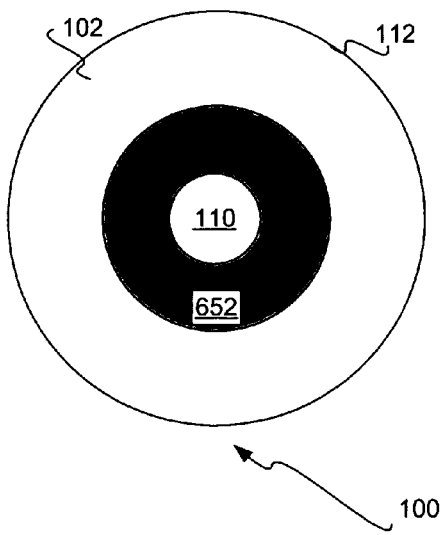
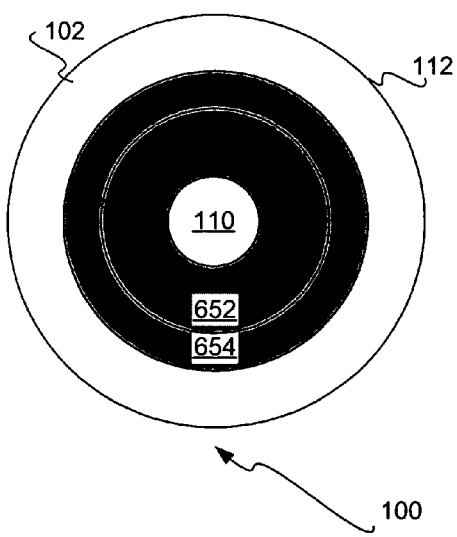
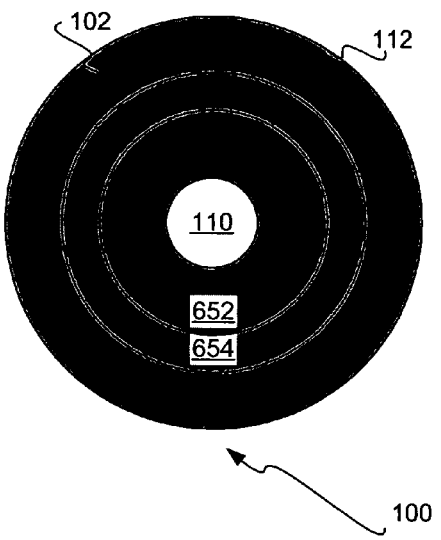

DETECTING RADIUS OF OPTICALLY WRITABLE LABEL SIDE OF OPTICAL DISC AT WHICH MARKINGS HAVE NOT BEEN WRITTEN

BACKGROUND OF THE INVENTION

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are often decidedly unprofessional looking. Special pre-cut labels that can be printed on with inkjet or other types of printers can also be used, but this is a laborious process: the labels must be carefully aligned on the discs, and so on. Special-purpose printers that print ink or another marking material directly on the discs may be used, but such printers are relatively expensive. In the patent application entitled "Integrated CD/DVD Recording and Label", filed on Oct. 11, 2001, and assigned Ser. No. 09/976,877, a solution to these difficulties is described, in which a laser is used to label optical discs.

Some user data-recordable optical discs are multi-session optical discs. Multi-session optically writable optical discs are those in which users can write data to the optical discs over multiple sessions. For example, a user may store a number of files on an optical disc on a Monday, and then on the following Wednesday store a number of additional files on the optical disc. Each time the user stores files on the optical disc is referred to as a session. Optically labeling optical discs that have multiple sessions on their data sides can be difficult, however. Even if blank space on the label side of an optical disc remains for future sessions, the optical disc drive may have difficulty determining which part of the label side is available for writing additional label information, and which part of the label side has already been written.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

FIG. 3 is a flowchart of a method for detecting or locating the first radius at which markings have not been written to the optically writable label side of an optical disc, according to an embodiment of the invention.

FIGS. 6B, 6C, 6D, and 6E are diagrams of an optical disc illustrating performance of the method of FIG. 6A, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
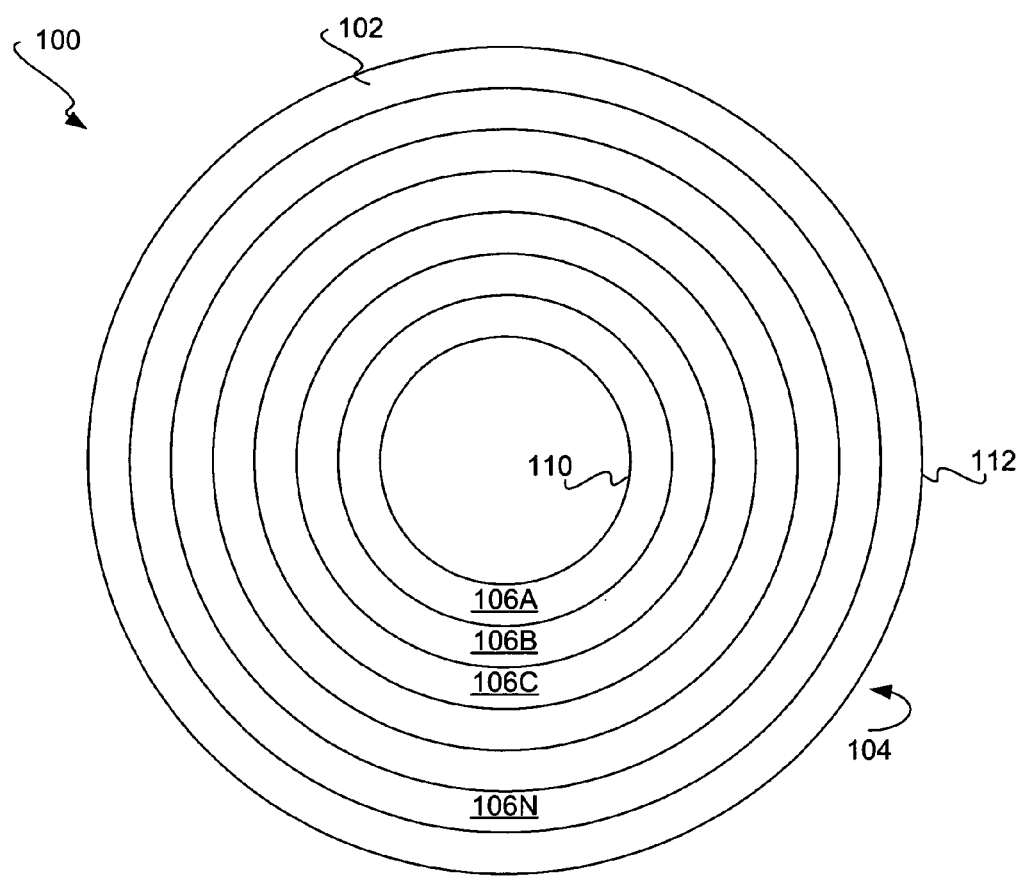
FIG. 1 is a diagram of an optical disc having an optically writable label side, according to an embodiment of the invention.

FIG. 1 shows an optical disc 100, according to an embodiment of the invention. The optical disc 100 may be a compact disc (CD), a digital versatile disc (DVD), or another type of optical disc. The optical disc 100 has an optically writable label side 102, which is shown in FIG. 1, and an optically writable data side 104 on the opposite side of the optical disc 100. An example of the optically writable label side 102 is particularly disclosed in the patent application entitled "Integrated CD/DVD Recording and Label", filed on Oct. 11, 2001, and assigned Ser. No. 09/976,877. The optically writable label side 102 may be written to in color and/or in black-and-white or monochrome.

The optical disc 100 has an inside edge 110 and an outside edge 112. The optical disc 100 also has a number of concentric circular tracks 106A, 106B, 106C, . . . , 106N, collectively referred to as the tracks 106, extending from the inside edge 110, or inside diameter, to the outside edge 112, or outside diameter. An optical marking mechanism, such as a laser, may write marks to individual pixels, or positions, of the tracks 106. For instance, as the optical disc 100 rotates, the laser is turned on while positioned adjacent to a given position or pixel to write a mark at that position or pixel. The optically writable label side 102 may have a material thereon that can change contrast and/or color in response to an optical marking mechanism, such as a laser, emitting an optical marking beam, such as laser light, incident thereto. There may be 700, 800, or more or fewer of the tracks 106 on an exemplary optical disc. The tracks 106 are also referred to as radii.

It is noted that in at least some embodiments of the invention, the tracks 106 are not physical tracks imprinted on or part of the optical disc 100, but rather are a byproduct of how optically writing to the label side 102 of the optical disc 100 is accomplished; that is, on a track-by-track basis. Therefore, the tracks 106 are referential in nature, and not physical in nature. Furthermore, whereas embodiments of the invention are described herein in relation to concentric circular tracks, as depicted in FIG. 1, other types of track schemes may also be employed, such as tracks that spiral outward from the inside edge 110 and end at the outside edge 112.

Figure 2A:
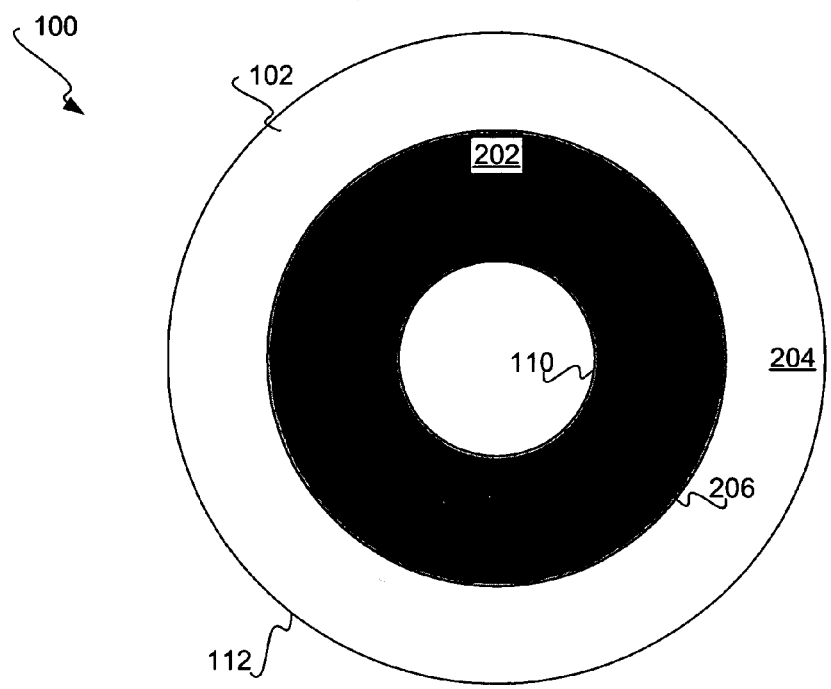
FIGS. 2A and 2B are diagrams of optical discs in which markings have been optically written to a portion of the optically writable label side of each disc, according to varying embodiments of the invention.
Figure 2B:
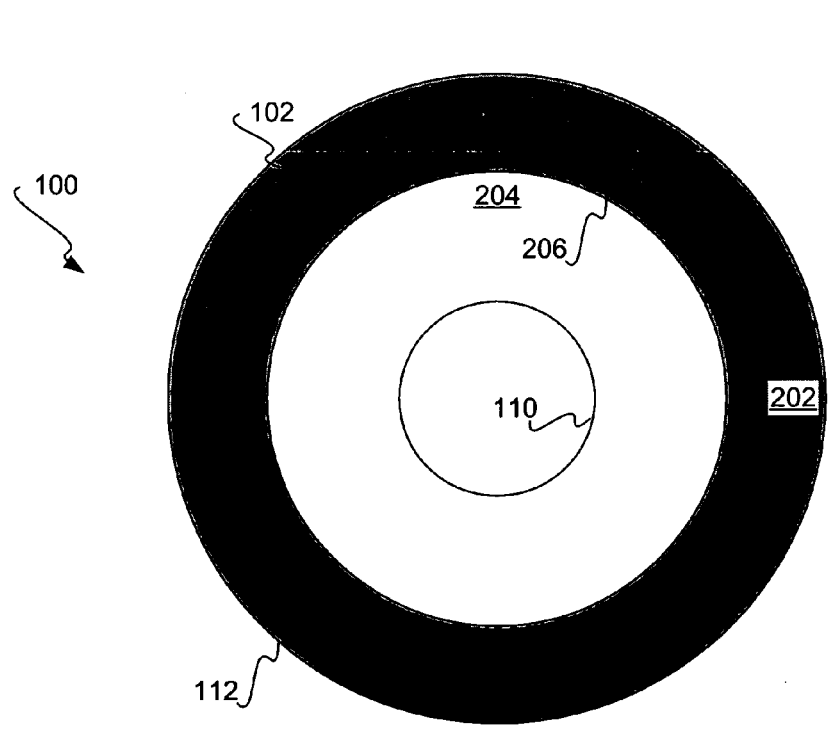

FIGS. 2A and 2B show the optical disc 100 in which markings have been optically written to a portion 202 of the optically writable label side 102 of the optical disc 100, according to varying embodiments of the invention. The portion 202 of the optically writable label side 102 of the optical disc 100 may have markings optically written to it using a laser or other optical marking mechanism. By comparison, the portion 204 of the optically writable label side 102 of the optical disc 100 does not have markings optically written to it. In FIG. 2A, the optically written portion 202 starts at the inside edge 110 and ends at the radius 206, such that the non-optically written portion 204 starts at the radius 206 and ends at the outside edge 112. In FIG. 2B, the optically written portion 202 starts at the outside edge 112 and ends at the radius 206, such that the non-optically written portion 204 starts at the radius 206 and ends at the inside edge 110.

Embodiments of the invention therefore locate the radius 206 as the first radius at which markings have not been optically written to the optically writable label side 102 of the optical disc 100. The radius 206 is immediately next to a second radius within the optically written portion 202 at which markings have been optically written to the optically writable label side 102 of the optical disc 100. That is, the radius 206 is the first radius within the non-optically written portion 204, at which markings have not been optically written to the label side 102. The radius 206 is next to the last radius within the optically written portion 202 in which markings have been optically written to the label side 102 of the optical disc 100.

Generally, the radius 206 is located as follows, where specific embodiments of the manner by which the radius 206 may be located are described in subsequent sections of the detailed description. The optical disc 100 is rotated, where the optically writable label side 102 is incident to a laser. The laser is turned on while the optical disc 100 is rotated. The optical disc 100 is radially scanned with the laser from the outside edge 112 to the inside edge 110, or from the inside edge 110 to the outside edge 112. Reflections of the laser are detected, such as by a photodetector. The radius 206 is located based on the reflection of the laser, in which the reflection has a value corresponding to whether or not markings have been optically written to the optically writable label side 102 of the optical disc 100.

For example, in one embodiment, the optically writable label side 102 of the optical disc 100 reflects more light from the laser when it does not have markings written thereto, and reflects less light from the laser when it does have markings written thereto. In another embodiment, the optically writable label side 102 of the optical disc 100 reflects less light from the laser when it does not have markings written thereto, and reflects more light from the laser when it does have markings written thereto. Based on whether more light or less light is reflected from the laser when no markings are written to the optically writable label side 102, scanning the laser from one edge to another edge of the optical disc 100 as the optical disc 100 is rotated enables locating the radius 206.

Methods to Detect Radius at Which Markings Have Not Been Written to Label Side

FIG. 3 shows a method 300 for detecting the first radius 206 at which markings have not been written to the optically writable label side 102 of the optical disc 100, according to an embodiment of the invention. The method 300 of FIG. 3 specifically radially scans the optical disc 100 of FIG. 2A with a laser from the outside edge 112 to the inside edge 110, or radially scans the optical disc 100 of FIG. 2B with the laser from the inside edge 110 to the outside edge 112. That is, the method 300 of FIG. 3 is intended to begin radially scanning the optical disc 100 with the laser from the non-optically written portion 204 of the label side 102, towards the optically written portion 202 of the label side 102, until the radius 206 has been located. The method 300 can be implemented as a computer program stored on a computer-readable medium, and executed by a processor or a controller. The computer-readable medium may be a volatile or non-volatile medium, and a semiconductor, magnetic, and/or optical medium in one embodiment of the invention.

The method 300 first rotates the optical disc 100 (302). The optical disc 100 is in one embodiment rotated at a speed greater than that at which the optical disc 100 is rotated when marking the label side 102 of the optical disc 100. The optical disc 100 is rotated at such speed because the reflectance at any given position on a radius of the optically writable label side 102 of the optical disc 100 adjacent to which the laser is positioned does not need to be detected. Rather, the average reflectance over all the positions of a radius is sufficient to determine whether the radius has any optically written markings. Therefore, rotating the optical disc 100 at a speed greater than that at which it is rotated when writing markings to the label side 102 of the optical disc 100 enables locating the radius 206 in an efficient manner. Therefore, in one embodiment, the speed at which the optical disc 100 is rotated is sufficiently great that the average reflectance over all the positions of a radius is detected, as opposed to individual reflectances at any given positions on the radius. Rotating the optical disc 100 at lower speeds is unnecessary, because the reflectance of the optically writable label side 102 at any given position on a radius adjacent to which the laser is positioned is not needed to locate the radius 206.

The optical disc 100 is then radially scanned with the laser incident to the optically writable label side 102 of the optical disc 100, from one of the edges 110 and 112 to the other edge (304). While the disc is being radially scanned, the power of the laser at which light is emitted may correspond to the power that is used when writing information to the data side 104 of the optical disc 100. The laser is scanned starting at a radius at one edge of the optical disc 100, towards a radius at the other edge of the optical disc 100.

The radius to which the laser is adjacent or incident to at a given point in time is referred to as the current radius. For example, in performing the method 300 relative to the optical disc 100 in FIG. 2A, the initial current radius corresponds to the edge 112, whereas the last current radius corresponds to the edge 110. In performing the method 300 relative to the optical disc 100 in FIG. 2B, by comparison the initial current radius corresponds to the edge 110, whereas the last current radius corresponds to the edge 112.

Although the disc is radially scanned with the laser at a sufficiently high power that would otherwise cause marks to be optically written to the current radius of the optically writable label side 102 of the optical disc 100, no such marks are optically written. No marks are optically written because the optical disc 100 is being rotated at a sufficiently high speed, so that no position of the current radius is positioned adjacent or incident to the laser for a sufficiently long time to cause a marking to be optically written to that position. At the same time, having the disc radially scanned with the laser at a higher power enables more light to be reflected from the optically writable label side 102, rendering detection of the location of the radius 206 more accurate and easier to accomplish.

The first radius at which markings have not been optically written to the optically writable label side 102 of the optical disc 100, the radius 206, is located (306). First, the reflectance of the laser at the current radius of the optical disc is detected (308). Because the optical disc 100 is being rotated sufficiently fast, the reflectance of the laser at the current radius that is detected is substantially the average reflectance of the laser over all positions of the current radius of the optical disc. It is thus noted that throughout the specification, where the term reflectance is used, in at least some embodiments this term encompasses the phrase average reflectance. In another embodiment of the invention, rotating the optical disc 100 at this sufficiently fast speed results in the reflectance that is detected being a small difference in the reflectances measured at a number of individual positions along the current radius of the disc.

The method 300 determines whether the reflectance of the laser at the current radius corresponds to markings previously written to the optically writable label side 102 of the optical disc 100 at this radius (310). Because the method 300 starts at radii within the non-optically marked portion 204 of the label side 102, location of the radius 206 is accomplished by detecting the first radius at which markings have been written, such that the radius 206 is the immediately previous radius. In FIG. 2A, such a radius is detected by scanning the laser from the outside edge 112 inward towards the inside edge 110, whereas in FIG. 2B, such a radius is detected by scanning the laser from the inside edge 110 outwards towards the outside edge 112.

Depending on the composition of the optically writable label side 102 of the optical disc 100, maximum reflectance may occur when no markings have been optically written to the label side 102 for the current radius. Therefore, if such maximum reflectance is not detected for the current radius, then this means that markings have been written to the current radius. If the maximum reflection of the optically writable label side 102 of the optical disc 100 is known, then detecting that markings have been written to the current radius can be accomplished even if the initial radius of the label side 102 that is scanned by the laser has optically written markings.

If the maximum reflection of the optically writable label side 102 of the optical disc 100 is not known, however, then the reflectance of the current radius may be compared to the reflectance of the previous radius to determine whether the current radius has optically written markings. Because the optical disc 100 is scanned from the non-optically written region 204 to the optically written region 202, if the reflectance detected for the current radius is less than the reflectance detected for the radius immediately previous to the current radius, then this means that the current radius has optically written markings. Such detection of the current radius as having optically written markings is operable where there is at least one radius on the optically writable label side 102 of the optical disc 100 that does not have optically written markings. The reflection of all the radii within the region 204 will be substantially identical, and the first radius having a lesser reflectance signifies the first radius of the region 202.

Furthermore, with a different composition of the optically writable label side 102, minimum reflectance may occur when no markings have been optically written to the label side 102. Therefore, if such minimum reflectance is not detected for the current radius, then this means that markings have been written to the current radius. As before, if the minimum reflection of the optically writable label side 102 of the optical disc 100 is known, then detecting that markings have been written to the current radius can be accomplished even if the initial radius of the label side 102 that is scanned by the laser has optically written markings.

If the minimum reflection of the optically writable label side 102 of the optical disc 100 is not known, however, then the reflectance of the current radius may be compared to the reflectance of the previous radius, as before, to determine whether the current radius has optically written markings. Because the optical disc 100 is scanned from the non-optically written region 204 to the optically written region 202, if the reflectance detected for the current radius is greater than the reflectance detected for the radius immediately previous to the current radius, then this means that the current radius has optically written markings. The reflection of all the radii within the region 204 will be substantially identical, and the first radius having a greater reflectance signifies the first radius of the region 202.

If the reflectance at the current radius corresponds to markings having been written to the optically writable label side 102 of the optical disc 100 (312), then the radius previous to the current radius is the radius 206, such that the radius previous to the current radius is selected as the first radius at which markings have not been optically written to the label side 102 (314). For example, with respect to the optical disc 100 in FIG. 2A, because scanning of the laser is accomplished from the outside edge 112 of the disc 100 inward, if the current radius is detected as having markings written thereto, then this means that the current radius is the radius on the outside diameter of the region 202. Therefore, the radius 206, which is the first radius at which optical markings have not been written to, corresponding to the radius on the inside diameter of the region 204, is the radius immediately previous to the current radius. That is, the radius most immediately scanned before the current radius, where optically written markings have been detected on the current radius, is the radius 206.

As another example, with respect to the optical disc 100 in FIG. 2B, because scanning of the laser is accomplished from the inside edge 110 of the disc 100 outward, if the current radius is detected as having markings written thereto, then this means that the current radius is the radius on the inside diameter of the region 202. Therefore, the radius 206, which is the first radius at which optical markings have not been written to, correspond to the radius on the outside diameter of the region 204, is the radius immediately previous to the current radius. That is, the radius most immediately scanned before the current radius, where optically written markings have been detected on the current radius, is the radius 206. The method 300 proceeds from 314 to 316, where radial scanning of the optically writable label side 102 is stopped.

However, if the reflectance at the current radius does not correspond to markings having been written to the optically writable label side 102 of the optical disc 100 at the current radius (312), and if the current radius is not the last radius of the optical disc 100 (318), then the laser is scanned, moved, or advanced to the next radius (320). This next radius is now the new current radius, and the method 300 is repeated beginning at 308. Once the last radius of the optical disc 100 has been reached (318), without detecting any radius at which markings have been optically written to the label side 102, then the method 300 stops radially scanning the laser (316).

That is, if the last radius of the optical disc 100 has been reached without detecting any radius at which markings have been optically written to the label side 102, then this means that the optically writable label side 102 is completely blank. For instance, there is no optically written region 202 for such an optical disc 100. In the context of the optical disc 100 in FIG. 2A, the last radius is the radius at the inside edge 110, since the optical disc 100 is scanned from the radius at the outside edge 112 inward. By comparison, in the context of the optical disc 100 in FIG. 2B, the last radius is the radius at the outside edge 112, since the optical disc 100 is scanned from the radius at the inside edge 110 outward.

Furthermore, if optically written markings are detected at the first radius of the optical disc 100, then this means that there are no radii on the optically writable label side 102 that are free of optically written markings. For instance, there is no non-optically written region 204 for such an optical disc. The first radius of the optical disc 100 is the radius at the outside edge 112 in FIG. 2A, since the laser begins scanning at the outside edge 112 for the disc 100 of FIG. 2A. By comparison, the first radius of the optical disc 100 is the radius at the inside edge 110 in FIG. 2B, since the laser begins scanning at the inside edge 110 for the disc 100 of FIG. 2B.

Figure 4:
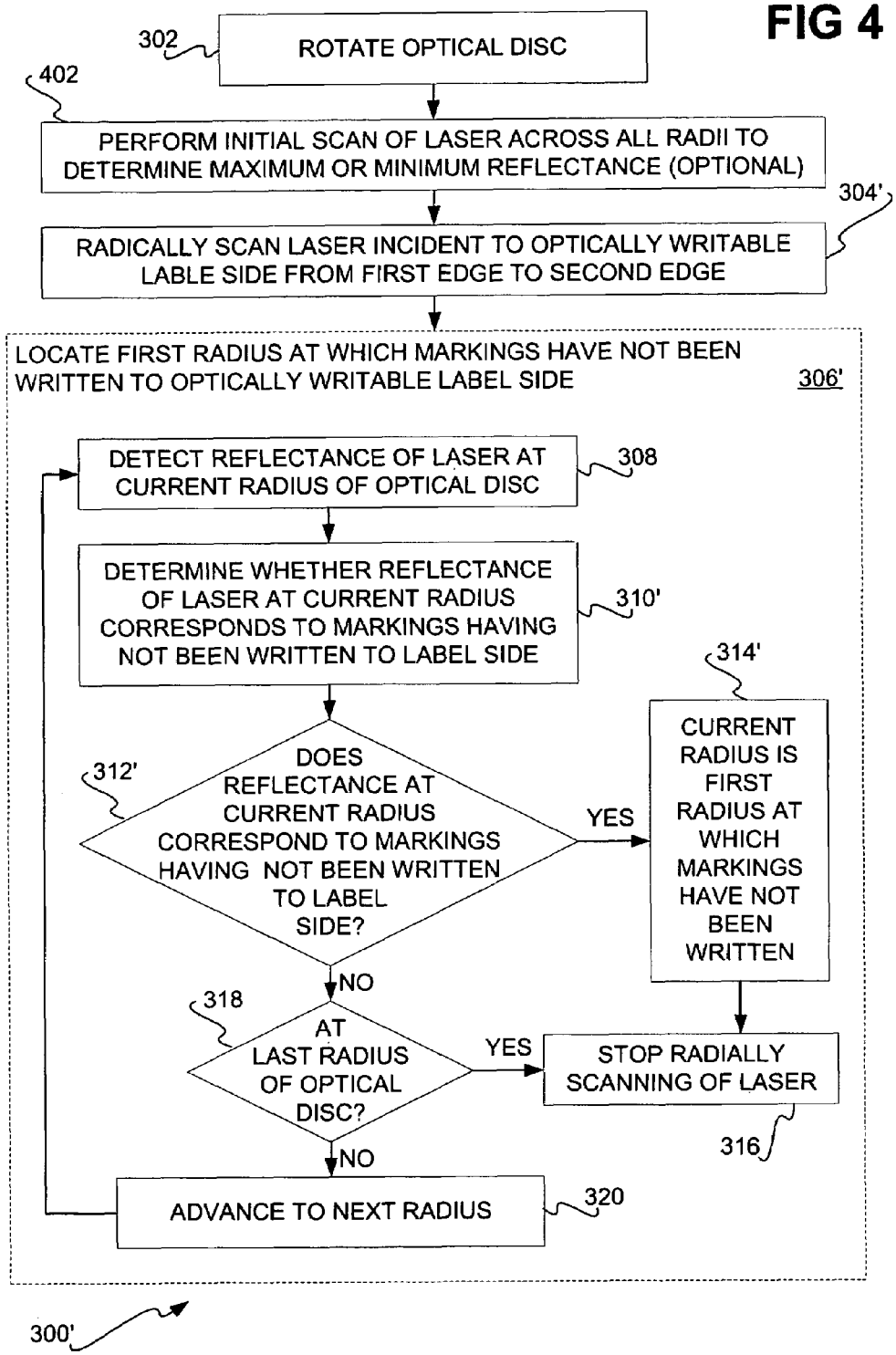
FIG. 4 is a flowchart of a method for detecting or locating the first radius at which markings have not been written to the optically writable label side of an optical disc, according to another embodiment of the invention.

FIG. 4 shows the method 300' for detecting the first radius 206 at which markings have not been written to the optically writable label side 102 of the optical disc 100, according to another embodiment of the invention. The method 300 of FIG. 4 specifically radially scans a laser from the inside edge 110 to the outside edge 112 of the optical disc 100 of FIG. 2A, or radially scans the laser from the outside edge 112 to the inside edge 110 of the optical disc 100 of FIG. 2B. That is, the method 300 of FIG. 4 is intended to begin radially scanning the laser from the optically written portion 202 of the label side 102 of the optical disc 100, towards the non-optically written portion 204 of the label side 102 of the optical disc 100, until the radius 206 has been located.

The method 300 of FIG. 4 thus is different from the method 300 of FIG. 3, in which the laser is radially scanned from the non-optically written portion 204 to the optically written portion 202 of the label side 102 of the optical disc 100. Furthermore, identically numbered parts of the method 300 of FIG. 4 and the method 300 of FIG. 3 are performed substantially the same. By comparison, correspondingly numbered parts of the method 300 of FIG. 4 and the method 300 of FIG. 3, such as 304' and 306' of FIG. 4 and 304 and 306 of FIG. 3, are performed in the method 300 of FIG. 4 similarly, but not identically, substantially just the differences of which are described.

The method 300 of FIG. 4 first rotates the optical disc (302), as in the method 300 of FIG. 3. Next, however, in some embodiments the method 300 performs an initial scan of the laser across all the radii of the optically label side 102 of the optical disc 100, from either the edge 110 to the edge 112 or vice-versa, to determine the maximum or minimum reflectance of a radius of the label side 102 (402). Where the non-optically written region 204 of the optically writable label side 102 of the optical disc 100 reflects light from the laser more than the optically written region 202 does, then the maximum reflectance is determined. Conversely, where the non-optically written region 204 reflects light from the laser less than the optically written region 202 does, then the minimum reflectance is determined.

The determination of the maximum or minimum reflectance in 402 is performed when the maximum or minimum reflectance of the optically writable label side 102 is not known a priori. The maximum or minimum reflectance is needed in the method 300 of FIG. 4 due to the manner by which scanning of the laser occurs, from the optically written region 202 to the non-optically written region 204. The reflectance of radii within the optically written region 202 may vary, depending on how many markings are on these radii. For instance, the reflectance of a radius within the region 202 may be greater or less than the immediately previous radius, depending on the markings written on the radius as compared to the markings written to the immediately previous radius. Therefore, to locate the radius 206, the first radius at which markings have not been written to the optically writable label side 102 of the optical disc 100, the method 300 in FIG. 4 cannot simply rely on whether the reflectance of a current radius is greater or less than the reflectance of the immediately previous radius.

By comparison, the method 300 in FIG. 3 can rely on whether the reflectance of a current radius is greater or less than the reflectance of the immediately previous radius, where both the regions 202 and 204 exist for a given optical disc 100. This is because the method 300 in FIG. 3 starts scanning of the laser incident to the non-optically written region 204, in which reflectances of radii will all be substantially the same, at a maximum or a minimum depending on the composition of the optically writable label side 102 of the optical disc 100. Therefore, the first radius located by the method 300 in FIG. 3 that has a reflectance greater or less than the reflectance of the immediately previous radius, depending on the composition of the label side 102, signifies the first radius of the optically written region 202. However, in the method 300 of FIG. 4, such a comparison does not signify that the laser is no longer positioned adjacent to the optically written region 202 and is now positioned adjacent to the non-optically written region 204. As has been indicated, this is because the reflectance of radii within the optically written region 202 themselves may vary.

Once the maximum or minimum reflectance has been determined in 402, the method 300 of FIG. 4 next radially scans the laser incident to the optically writable label side 102 from one of the edges 110 and 112 to the other edge of the optical disc 100 (304'). The method 300 of FIG. 4 specifically scans the laser from the optically written region 202 to the non-optically written region 204. Therefore, with respect to the optical disc 100 of FIG. 2A, the method 300 of FIG. 4 scans the laser from the inside edge 110 to the outside edge 112, such that the radius at the inside edge 110 is initially said to be the current radius. By comparison, with respect to the optical disc 100 of FIG. 2B, the method 300 of FIG. 4 scans the laser from the outside edge 112 to the inside edge 110, such that the radius at the outside edge 112 is initially said to be the current radius.

The first radius of the optically writable label side 102 of the optical disc 100 at which markings have not been optically written, which is the radius 206, is then located (306'). First, the reflectance of the laser at the current radius of the optical disc is detected (308). The method 300 determines whether the reflectance of the laser at the current radius corresponds to markings having not been written to the optically writable label side 102 of the optical disc 100 at this radius (310').

Depending on the composition of the optically writable label side 102 of the optical disc 100, maximum reflectance may occur when no markings have been optically written to the label side 102. Therefore, once such maximum reflectance has been detected for the current radius, the radius 206 has been located. The maximum reflectance may be known a priori, or determined in 402. If the maximum reflectance is not known a priori, then the method 300 of FIG. 4 presumes that the non-optically written region 204 exists. Otherwise, the maximum reflectance determined in 402 does not correspond to portions of the optically writable label side 102 in which no markings have been written, but rather corresponds to the portions of the label side 102 in which minimal markings have been written.

However, if the maximum reflectance is known a priori, then the method 300 of FIG. 4 is operable in relation to the optical disc 100 not having the non-optically written region 204, such that all radii of the optical disc 100 have optically written markings. This is because the method 300 of FIG. 4 with such an optical disc 100 can conclude that if the maximum reflectance, known a priori, is not detected for any radius, then optically written markings are on all the radii of the optically writable label side 102. That is, the optically written region 202 extends over the entirety of the optically writable area of the label side 102 of the optical disc 100.

Furthermore, with a different composition of the optically writable label side 102, minimum reflectance may occur when no markings have been optically written to the label side 102. Therefore, once such minimum reflectance has been detected for the current radius, the radius 206 has been located. The minimum reflectance may be known a priori, or determined in 402. If the minimum reflectance is not known a priori, the method 300 of FIG. 4 presumes that the non-optically written region 204 exists, as before. However, if the minimum reflectance is known a priori, then the method 300 of FIG. 4 is operable in relation to the optical disc 100 not having the non-optically written region 204, also as before.

If the reflectance at the current radius corresponds to markings not having been optically written to the optically writable label side 102 of the optical disc 100 (312'), then the current radius is the radius 206, such that the current radius is selected as the first radius at which markings have not been optically written (314'). For example, with respect to the optical disc 100 in FIG. 2A, because scanning of the laser is accomplished from the inside edge 110 of the disc 100 outward, if the current radius is detected as not having markings written thereto, then this means that the current radius is the radius 206. As another example, with respect to the optical disc 100 in FIG. 2B, because scanning of the laser is accomplished from the outside edge 112 of the disc 100 inward, if the current radius is detected as not having markings written thereto, then this means that the current radius is the radius 206. The method 300 of FIG. 4 proceeds from 314' to 316, where the laser's radial scanning of the optically writable label side 102 is stopped.

However, if the reflectance at the current radius does not correspond to markings not having been written to the optically writable label side 102 of the optical disc 100 at the current radius (312'), and if the current radius is not the last radius of the optical disc 100 (318), then the laser is scanned, moved, or advanced to the next radius (320). This next radius is now the current radius, and the method 300 of FIG. 4 is repeated beginning at 308. Once the last radius of the optical disc 100 has been reached (318), without detecting any radius at which markings have not been optically written to the label side 102, then the method 300 stops radially scanning the laser (316).

That is, if the last radius of the optical disc 100 has been reached without detecting any radius at which markings have not been optically written to the label side 102, then this means that all the radii of the optically writable label side 102 have optically written markings. For instance, there is no non-optically written region 204 for such an optical disc 100. In the context of the optical disc 100 in FIG. 2A, the last radius is the radius at the outside edge 112, since the optical disc 100 is scanned from the radius at the inside edge 110 inward. By comparison, in the context of the optical disc 100 in FIG. 2B, the last radius is the radius at the inside edge 110, since the optical disc 100 is scanned from the radius at the outside edge 112 inward.

Furthermore, if optically written markings are not detected at the first radius of the optical disc 100, then this means that there are no radii of the optically writable label side 102 that have optically written markings. For instance, there is no optically written region 202 for such an optical disc 100. The first radius of the optical disc 100 is the radius at the inside edge 110 in FIG. 2A, since the laser begins scanning at the inside edge 110 for the disc 100 of FIG. 2A. By comparison, the first radius of the optical disc 100 is the radius at the outside edge 112 in FIG. 2B, since the laser begins scanning at the outside edge 112 for the disc 100 of FIG. 2B.

Mass Storage Device and Other Methods

Figure 5:
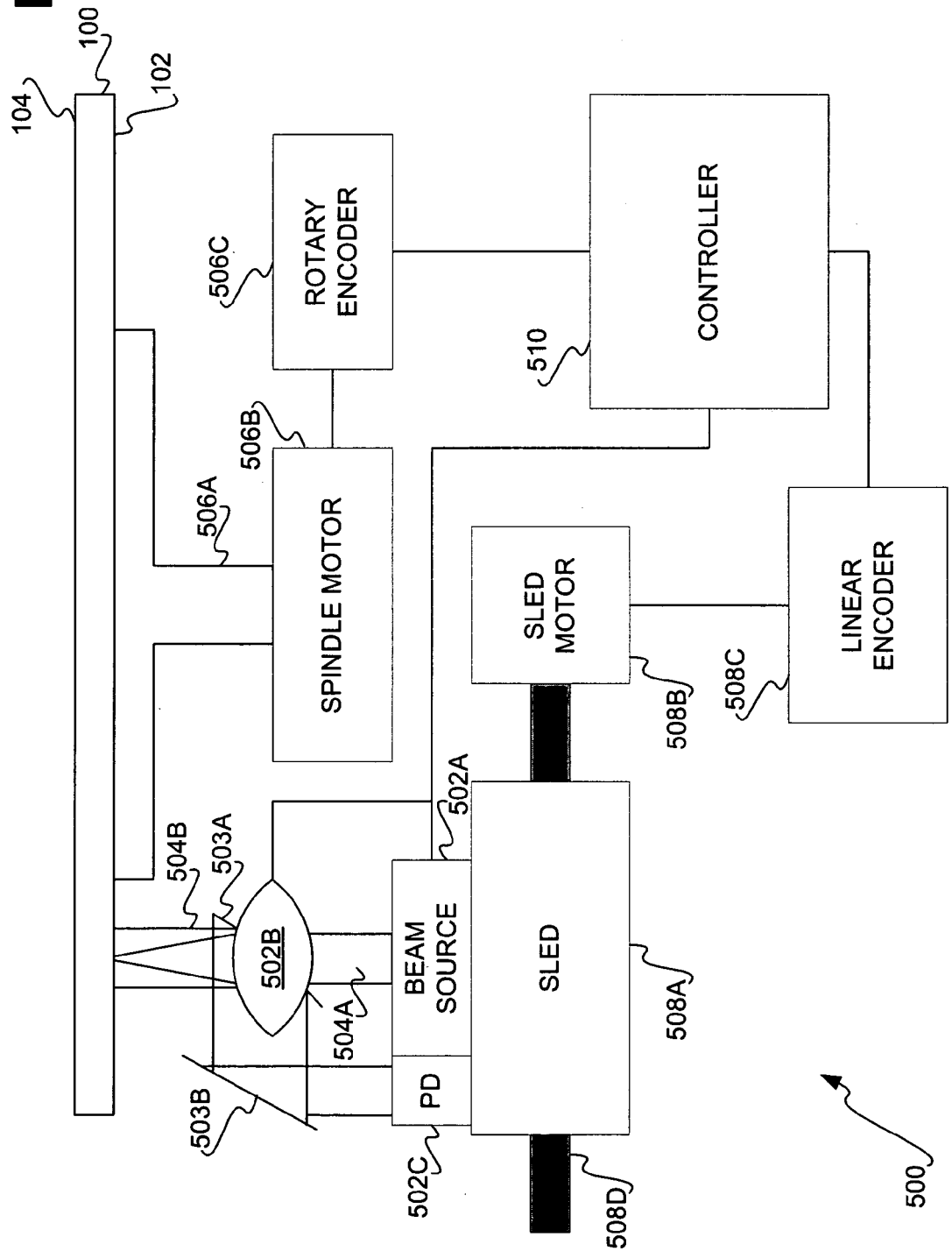
FIG. 5 is a diagram of a mass storage device, according to an embodiment of the invention.

FIG. 5 shows a mass storage device 500, according to an embodiment of the invention. The mass storage device 500 is for reading from and/or writing to the optical disc 100. More specifically, the mass storage device 500 is for reading from and/or writing to an optically writable data side 104 of the optical disc 100, and/or an optically writable label side 102 of the optical disc 100, in accordance with the preceding section of the detailed description. The mass storage device 500 includes a beam source 502A, an objective lens 502B, and a photodetector 502C, which are collectively referred to as the optical marking mechanism 502. The storage device 500 further includes mirrors 503A and 503B, collectively referred to as the mirrors 503.

The storage device 500 also includes a spindle 506A, a spindle motor 506B, and a rotary encoder 506C, which are collectively referred to as the first motor mechanism 506. The rotary encoder 506C is depicted in FIG. 5 as communicatively coupled to the spindle motor 506B, such that it receives or detects signals from the motor 506B. By comparison, in another embodiment of the invention, the rotary encoder 506C may receive or detect signals from the optical disc 100 directly, instead of from the motor 506B. The device 500 further includes a sled 508A, a sled motor 508B, a linear encoder 508C, and a rail 508D, which are collectively referred to as the second motor mechanism 508. Finally, the mass storage device 500 includes a controller 510.

The optical marking mechanism 502 focuses an optical beam 504A, such as a laser, on the optical disc 100, for at least marking the label side 102 of the optical disc 100, and which also may be used to read from the label side 102 of the disc 100, as well as read from and/or write to the data side 104 of the disc 100. Specifically, the beam source 502A generates the optical beam 504A, which is focused through the objective lens 502B onto the optical disc 100, such as in a manner known to those of ordinary skill within the art. The beam 504A is reflected from the label side 102 as the beam 504B, which is reflected from the mirror 503A, to the mirror 503B, and finally to the photodetector 502C. The photodetector 502C thus measures the value of the reflectance of the beam 504A, as the reflected beam 504B. The mechanism 502 generates the beam 504A at a given power, as has been described.

The first motor mechanism 506 rotates the optical disc 100. Specifically, the optical disc 100 is situated on the spindle 506A, which is rotated, or moved, by the spindle motor 506B to a given position specified by the rotary encoder 506C communicatively coupled to the spindle motor 506B. The rotary encoder 506C may include hardware, software, or a combination of hardware and software.

The second motor mechanism 508 moves the optical marking mechanism 502 radially relative to the optical disc 100. Specifically, the optical marking mechanism 502 is situated on the sled 508A, which is moved on the rail 508D by the sled motor 508B to a given position specified by the linear encoder 508C communicatively coupled to the sled motor 508B. The linear encoder 508C may include hardware, software, or a combination thereof.

The controller 510 in one embodiment causes the optical marking mechanism 502 to radially move from one track, or radius, of the label side 102 of the optical disc 100 to another track, or radius, of the label side 102. Thus, the controller 510 is able to cause the second motor mechanism 508 to move the optical marking mechanism 502 from a first edge to a second edge of the optically writable label side 102 of the optical disc 100. Via the photodetector 502C, the controller 510 is able to detect the first radius at which markings have not been written to the label side 102 of the optical disc 100, as has been described. The controller 510 further is to cause the first motor mechanism 506 to rotate the optical disc 100 as has been described.

As can be appreciated by those of ordinary skill within the art, the components depicted in the mass storage device 500 are representative of one embodiment of the invention, and do not limit all embodiments of the invention. Other control approaches can also be employed. As only one example, the sled 508A may be positioned with the sled motor 508B, with finer adjustment obtained using a voice coil attached to the source 502A and/or the lens 502B.

Figure 6A:
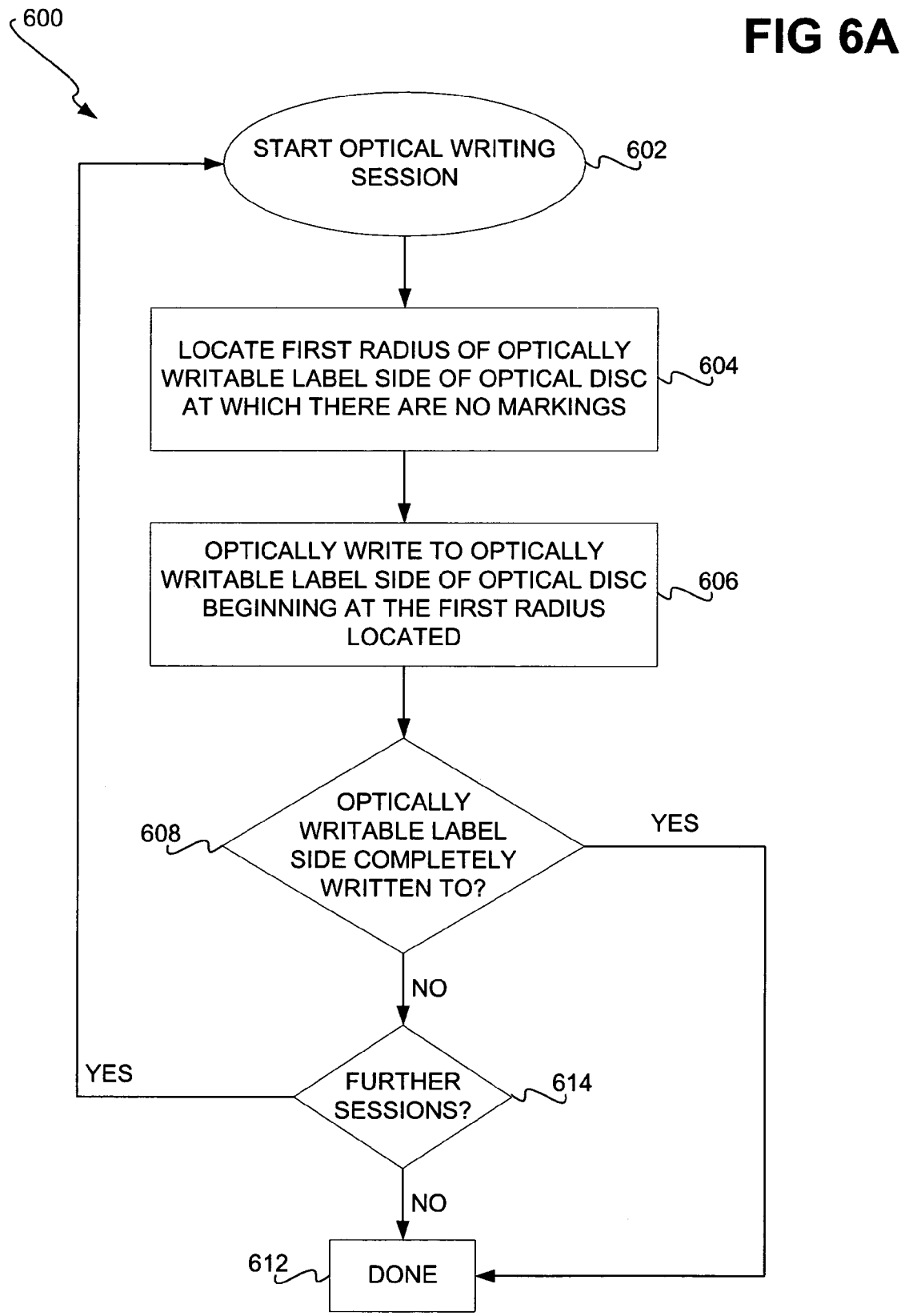
FIG. 6A is a flowchart of a method for optically labeling the optically writable label side of an optical disc over multiple sessions, according to an embodiment of the invention.

FIG. 6A shows a method 600 for optically writing to the optically writable label side 102 of the optical disc 100, according to an embodiment of the invention. The mass storage device 500 of FIG. 5 may perform at least part of the method 600 in one embodiment of the invention. For instance, the controller 510 may perform the method 600. Furthermore, the method 600 may be implemented as a computer program stored on a computer-readable medium and executed by the controller 510 or a processor. The computer-readable medium may be a volatile or non-volatile medium, and a semiconductor, magnetic, and/or optical medium in one embodiment of the invention.

A new optical writing session is started (602). The first radius of the optically writable label side 102 of the optical disc 100 at which there are no markings is located (604). For instance, the first radius may initially be the inside edge 110 of the label side 102, where no markings have previously been written to the label side 102 of the optical disc 100. Once this radius has been located, the optically writable label side 102 of the optical disc 100 is written to beginning at this radius (606), and proceeding to a further radius.

If the optically writable label side 102 is completely written after the session most immediately started in 602 (608), then the method 600 is finished (612). That the optically writable label side 102 has been completely written to after the session most immediately started in 602 means that there are no further radii on the label side 102 to which to write markings. If there are radii on the label side 102 left in which further sessions can write markings to (608), however, and once there are such further sessions (614), then the next optical writing session begins at 602 as has been described, but where the first radius in 604 is the radius next to the last radius written to in the immediately previous session. If no further sessions are desired (614), however, then the method 600 is finished (612).

FIGS. 6B, 6C, 6D, and 6E illustratively depicted example performance of the method 600 of FIG. 6A, according to an embodiment of the invention. In FIG. 6B, the optically writable label side 102 of the optical disc 100 has not yet been written to, or marked. The optical disc 100 has the inside edge 110 and the outside edge 112. In FIG. 6C, a first optical writing session has resulted in markings being optically written on a portion 652 of the label side 602.

In FIG. 6D, a second optical writing session has resulted in markings being optically written on a portion 654 of the label side 602, starting at the first radius past the portion 652 that was not written to during the first optical writing session. Finally, in FIG. 6E, a third optical writing session has resulted in markings being optically written on a portion 656 of the label side 602, starting at the first radius past the portion 654 that was not written to during the second optical writing session. The method 600 may be finished after the third optical writing session depicted in FIG. 6E, since the portion 656 extends to the outside edge 112, such that there are no more radii left on the label side 102 to which markings can be written.

Figure 7:
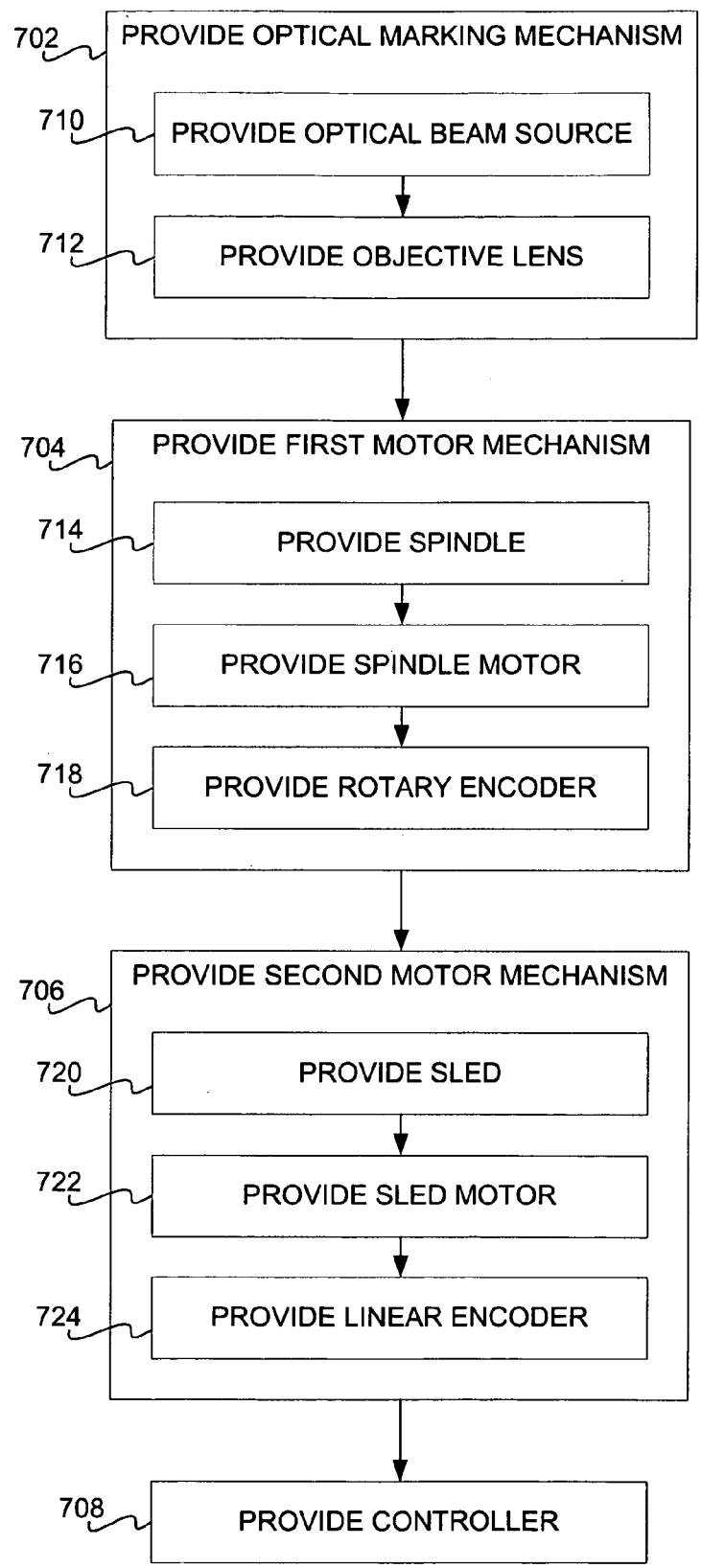
FIG. 7 is a flowchart of a method for manufacturing the mass storage device of FIG. 5, according to an embodiment of the invention.

FIG. 7 shows a method of manufacture 700 for the mass storage device 500 of FIG. 5, according to an embodiment of the invention. The method 700 includes providing the optical marking mechanism 502 (702), providing the first motor mechanism 506 (704), providing the second motor mechanism 508 (706), and providing the controller 510 (708). In one embodiment, providing the optical marking mechanism 502 includes providing the optical beam source 502A (710) and the objective lens 502B (712), whereas providing the first motor mechanism 506 in one embodiment includes providing the spindle 506A (714), the spindle motor 506B (716), and the rotary encoder 506C (718). Finally, providing the second motor mechanism 508 in one embodiment includes providing the sled 508A (720), the sled motor 508B (722), and the linear encoder 508C (724).

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
   rotating an optical disc having an optically writable label side;
   radially scanning the optical disc with a laser incident to the optically writable label side, from a first edge of the optical disc to a second edge of the optical disc; and,
   while radially scanning the optical disc with the laser from the first edge to the second edge, detecting a first radius at which markings have not been written to the optically writable label side of the optical disc next to a second radius at which markings have been written to the optically writable label side of the optical disc.

2. The method of claim 1, wherein rotating the optical disc comprises rotating the optical disc at a speed greater than that at which the optical disc is rotated when writing markings to the label side of the optical disc.

3. The method of claim 2, wherein radially scanning the optical disc with the laser comprises radially scanning the optical disc with the laser at a write-related power, the speed at which the optical disc rotates preventing marks from being written to the optically writable label side of the optical disc.

4. The method of claim 1, wherein radially scanning the optical disc with the laser incident to the optically writable label side comprises radially scanning the optical disc with laser from an outside edge of the optical disc to an inside edge of the optical disc.

5. The method of claim 1, wherein radially scanning the optical disc with the laser incident to the optically writable label side comprises radially scanning the optical disc with laser from an inside edge of the optical disc to an outside edge of the optical disc.

6. The method of claim 1, wherein radially scanning the optical disc with laser incident to the optically writable label side comprises successively scanning the optical disc with the laser at each of a plurality of radii of the optical disc, from a radius at the first edge of the optical disc to a radius at the second edge of the optical disc, until the first radius at which markings have not been written to the optically writable label side of the optical disc has been detected.

7. The method of claim 6, wherein detecting the first radius at which markings have not been written to the optically writable label side of the optical disc comprises:
  detecting reflectance of the laser at a current radius of the optical disc;
  determining whether the reflectance of the laser at the current radius corresponds to markings present at the current radius of the optically writable label side of the optical disc; and,
  where the reflectance of the laser at the current radius corresponds to markings having been written to the optically writable label side of the optical disc, establishing that the first radius at which markings have not been written to the optically writable label side of the optical disc is a radius immediately previous to the current radius of the optical disc, the current radius being the second radius.

8. The method of claim 7, wherein detecting the first radius at which markings have not been written to the optically writable label side of the optical disc further comprises:
  otherwise, where the radius at the second edge of the optical disc has not yet been reached,
    advancing to a next radius of the optical disc; and,
    repeating detecting the reflectance of the laser and determining whether the reflectance of the laser corresponds to markings have been written to the optically writable label side of the optical disc.

9. The method of claim 7, wherein the optical disc is rotated sufficiently fast that detecting the reflectance of the laser at a current radius of the optical disc results in detection of an average reflectance of the laser over all positions of the current radius of the optical disc.

10. The method of claim 7, wherein the optical disc is rotated sufficiently fast that detecting the reflectance of the laser at a current radius of the optical disc results in detection of a small change in reflectance of the laser over a number of positions of the current radius of the optical disc.

11. The method of claim 7, wherein determining whether the reflectance of the laser at the current radius corresponds to markings having been written to the optically writable label side of the optical disc comprises determining that the reflectance of the laser at the current radius is higher than reflectance of the laser at the radius immediately previous to the current radius of the optical disc.

12. The method of claim 7, wherein determining whether the reflectance of the laser at the current radius corresponds to markings having been written to the optically writable label side of the optical disc comprises determining that the reflectance of the laser at the current radius is lower than reflectance of the laser at the radius immediately previous to the current radius of the optical disc.

13. The method of claim 6, wherein detecting the first radius at which markings have not been written to the optically writable label side of the optical disc comprises:
  detecting reflectance of the laser at a current radius of the optical disc;
  determining whether the reflectance of the laser at the current radius corresponds to an absence of markings at the current radius on the optically writable label side of the optical disc; and,
  where the reflectance of the laser at the current radius corresponds to markings not having been written to the optically writable label side of the optical disc, establishing that the first radius at which markings have not been written to the optically writable label side of the optical disc is the current radius, a radius immediately previous to the current radius of the optical disc being the second radius.

14. The method of claim 13, wherein detecting the first radius at which markings have not been written to the optically writable label side of the optical disc further comprises:
  otherwise, where the radius at the second edge of the optical disc has not yet been reached,
    advancing to a next radius of the optical disc; and,
    repeating detecting the reflectance of the laser and determining whether the reflectance of the laser corresponds to markings not having been written to the optically writable label side of the optical disc.

15. The method of claim 13, further comprising initially radially scanning the optical disc with the laser from the first edge to the second edge of the optical disc to locate a radius at which a maximum reflectance occurs, the maximum reflectance corresponding to markings not having been written to the optically writable label side of the optical disc, such that the first radius at which markings have not been written to the optically writable label side is a radius next to a radius at which reflectance is less than the maximum reflectance.

16. The method of claim 13, further comprising initially radially scanning the optical disc with the laser incident to the optically writable label side from the first edge to the second edge of the optical disc to locate a radius at which a minimum reflectance occurs, the minimum reflectance corresponding to markings not having been written to the optically writable label side of the optical disc, such that the first radius at which markings have not been written to the optically writable label side is a radius next to a radius at which reflectance is greater than the minimum reflectance.

17. A method comprising:
  rotating an optical disc having an optically writable label side at a speed greater than that at which the optical disc is rotated when writing optically markings to the label side of the optical disc;
  moving a laser incident to a radius at a first edge of the optically writable label side of the optical disc;
  detecting reflectance of the laser at the radius of the optical disc;
  based on the reflectance of the laser at the radius of the optical disc, determining whether a first radius at which markings have not been written to the optically writable label side of the optical disc, next to a second radius at which markings have been written to the optically writable label side of the optical disc, has been located; and, where the first radius has not been located, repeating moving the laser to a next radius of the optically writable label side of the optical disc, detecting reflectance of the laser at the next radius, and determining whether the first radius has been located based on the reflectance of the laser, until the first radius has been located or a radius at a second edge of the optically writable label side of the optical disc has been reached.

18. The method of claim 17, wherein detecting the reflectance of the laser comprises detecting an average reflectance of the laser over all positions of the radius.

19. An optical disc adapted to receive optically writable markings on an optically writable label side thereof formed according to a method comprising:
during a first session,
optically writing first markings on the optically writable label side from a first radius of the optical disc to a second radius of the optical disc;
during a second session,
locating the second radius of the optical disc; and,
optically writing second markings on the optically writable label side from the second radius of the optical disc to a third radius of the optical disc.

20. The optical disc of claim 19, further comprising, during a third session,
locating the third radius of the optical disc; and,
optically writing third markings on the optically writable label side from the third radius of the optical disc to a fourth radius of the optical disc.

21. The optical disc of claim 19, wherein locating the second radius of the optical disc during the second session comprises:
rotating the optical disc;
radially scanning the optical disc with a laser incident to the optically writable label side from a first edge of the optical disc towards a second edge of the optical disc; and,
while radially scanning the optical disc with the laser, detecting the second radius based on average reflectance of the laser at each of a plurality of radii scanned by the laser.

22. The optical disc of claim 21, wherein rotating the optical disc comprises rotating the optical disc at a speed greater than that at which the optical disc is rotated when writing markings to the label side of the optical disc, and
wherein radially scanning the optical disc with the laser comprises radially scanning the optical disc with the laser at a write-related power, the speed at which the optical disc rotates preventing marks from being written to the optically writable label side of the optical disc when locating the second radius.

23. A mass storage device comprising:
an optical marking mechanism to at least optically write markings to and optically read markings from an optically writable label side of an optical disc;
a first motor mechanism to rotate the optical disc;
a second motor mechanism to move the optical marking mechanism radially relative to the optical disc; and,
a controller to cause the second motor mechanism to move the optical marking mechanism from a first edge toward a second edge of the optically writable label side of the optical disc to detect a first radius at which markings have not been written to the optically writable label side of the optical disc next to a second radius at which markings have been written to the optically writable label side of the optical disc.

24. The mass storage device of claim 23, wherein the optical marking mechanism includes a photodetector to detect light output by the optical marking mechanism and reflected by the optical disc.

25. The mass storage device of claim 23, wherein the controller is to cause the first motor mechanism to rotate the optical disc at a speed greater than that at which the optical disc is rotated when writing markings to the label side of the optical disc.

26. The mass storage device of claim 23, wherein the optical marking mechanism emits laser light, and the controller is to cause the optical marking mechanism to emit the laser light at a write-related power while detecting the first radius at which markings have not been written to the optically writable label side of the optical disc.

27. A mass storage device comprising:
marking means for optically writing markings on an optically writable label side of an optical disc;
means for rotating the optical disc;
means for moving the marking means radially relative to the optical disc; and,
means for detecting a first radius at which markings have not been written to the optically writable label side of the optical disc next to a second radius at which markings have been written to the optically writable label side of the optical disc.

28. A method for manufacturing a mass storage device comprising:
providing an optical marking mechanism that is able to optically write markings to and optically read markings from an optically writable label side of an optical disc;
providing a plurality of motor mechanisms that is able to rotate the optical disc and to move the optical marking mechanism radially relative to the optical disc; and,
providing a controller that is able to cause the optical marking mechanism to move from a first edge toward a second edge of the optically writable label side of the optical disc to detect a first radius at which markings have not been written to the optically writable label side of the optical disc next to a second radius at which markings have been written to the optically writable label side of the optical disc.

29. An optical disc comprising:
an optically writable label side;
a plurality of radii definable on the optically writable label side from a first edge of the optical disc to a second edge of the optical disc, each radius having a plurality of positions that are individually optically writable;
a first plurality of markings writable during a first session on at least some of the plurality of positions on each radius from a first radius of the optical disc at the first edge thereof to a second radius of the optical disc closer to the second edge than the first radius is; and,
a second plurality of markings writable during a second session on at least some of the plurality of positions on each radius from the second radius of the optical disc to a third radius of the optical disc closer to the second edge than the second radius is,
wherein the second radius of the optical disc is automatically located prior to the second plurality of markings being written.

30. The optical disc of claim 29, further comprising a third plurality of markings written during a third session on at least some of the plurality of positions on each radius from the third radius of the optical disc to a fourth radius of the optical disc closer to the second edge than the third radius is, wherein the third radius of the optical disc is automatically located prior to the third plurality of markings being written.

31. The optical disc of claim 29, further comprising an optically writable data side opposite to the optically writable label side.

32. A computer-readable medium having stored thereon a computer program comprising:
- a first segment of computer-executable instructions configured to cause an optical disc to rotate;
- a second segment of computer-executable instructions configured to cause an optical marking mechanism to move radially from a first edge of the optical disc to the second edge of the optical disc and for scanning the optical disc with a laser onto an optically writable label side of the optical disc during movement of the optical marking mechanism; and,
- a third segment of computer-executable instructions configured to locate a first radius at which markings have not been written to the optically writable label side of the optical disc next to a second radius at which markings have been written to the optically writable label side of the optical disc, based on reflectance of the laser scanned onto the optically writable label side of the optical disc.

33. A method comprising:
causing an optical disc to rotate;

causing an optical marking mechanism to move radially from a first edge of the optical disc to the second edge of the optical disc and for scanning the optical disc with a laser onto an optically writable label side of the optical disc during movement of the optical marking mechanism; and, locating a first radius at which markings have not been written to the optically writable label side of the optical disc next to a second radius at which markings have been written to the optically writable label side of the optical disc, based on reflectance of the laser scanned onto the optically writable label side of the optical disc.

34. A method comprising:

rotating an optical disc having an optically writable label side at a speed greater than a marking speed; and, radially scanning the optical disc with a laser incident to the optically writable label side to determine a concentric region of the label side at which markings have not been written.

* * * * *